United States Patent [19]

Finzel

[11] Patent Number: 4,772,088
[45] Date of Patent: Sep. 20, 1988

[54] CONNECTOR ELEMENT FOR A PLURALITY OF LIGHT WAVEGUIDES

[75] Inventor: Lothar Finzel, Munich, Fed. Rep. of Germany

[73] Assignee: Siemens Aktiengesellschaft, Berlin and Munich, Fed. Rep. of Germany

[21] Appl. No.: 21,686

[22] Filed: Mar. 4, 1987

[30] Foreign Application Priority Data

Mar. 11, 1986 [DE] Fed. Rep. of Germany ....... 3608019

[51] Int. Cl.⁴ .............................................. G02B 6/38
[52] U.S. Cl. .................. 350/96.21; 350/96.22
[58] Field of Search .................. 350/96.2, 96.21, 96.22

[56] References Cited

U.S. PATENT DOCUMENTS 4,274,708 6/1981 Cocito et al. ..................... 350/96.21
4,657,341 4/1987 Sammueller ..................... 350/96.22
4,662,713 5/1987 Davies et al. ..................... 350/96.2

Primary Examiner—John Lee
Assistant Examiner—John Ngo
Attorney, Agent, or Firm—Hill, Van Santen, Steadman & Simpson

[57] ABSTRACT

A connector device for a plurality of light waveguides comprises two carrier members having centering grooves which are aligned together by means of a guide elements received in guide grooves and bridging the two carrier members. In order to maintain pressure between the guide elements and guide grooves, a spring clip is provided for applying a holding force in this location without applying a force on the carrier member adjacent the centering grooves.

16 Claims, 1 Drawing Sheet

CONNECTOR ELEMENT FOR A PLURALITY OF LIGHT WAVEGUIDES

CROSS REFERENCE TO RELATED APPLICATIONS

The present application contains subject matter which is also disclosed in applicant's copending application Ser. No. 021,829, filed Mar. 4, 1987, and to applicant's copending application U.S. Ser. No. 021,689, filed Mar. 4, 1987.

BACKGROUND OF THE INVENTION

The present invention is directed to a connector element or device for a plurality of light waveguides which include two separate carrier members which have centering grooves receiving waveguides and have a parting location containing abutting end surfaces for the waveguides. The connector element has bridging elements which extend between the two carrier members so that when the two carrier members and the bridging elements are assembled, the waveguides and the grooves of one carrier member are aligned with the waveguides in the other carrier member.

A connector element or device, which has two carrier elements containing guide grooves for receiving optical fibers and having end faces of the fibers of each carrier abutting each other with the aid of a bridging element is disclosed in allowed U.S. patent application, Ser. No. 634,468, which was filed on July 24, 1984, and issued as U.S. Pat. No. 4,657,341 on Apr. 14, 1987, whose disclosure is incorporated by reference and which was based on German Application resulting in German OS No. 34 08 783. When a releasable arrangement, for example a clamp element, was provided for assembling of the parts of the connector device, then difficulties occurred. These difficulties are because the relatively thin carrier members dare not be subjected to any undesired or injurious mechanical stresses; however, an adequately high pressing force is required for a reliable coherent and precise alignment of the light waveguide fibers or, respectively, of the abutting regions of the carrier members relative thereto.

SUMMARY OF THE INVENTION

The present invention is directed to providing a clamping coherency between the carrier members on the one hand and the guide elements on the other hand, which has as a gentle effect as possible on the carrier members and to simultaneously guarantee adequately high pressing powers and to thereby keep forces optimally away from the actual abutting region of the light waveguide ends.

This is achieved in accordance with the present invention by an improvement in a connector element or device for a plurality of light waveguides which connector device includes two carrier members having centering grooves and a parting location between the two carrier members containing abutting locations for the light waveguides which are received in the grooves, a bridging guide element extending between the two carriers and fixing means for holding the carrier members and guide element together in an assembled relationship. The improvement is that the fixing means includes at least one spring clip to provide for the coherency and pressing non-positively only laterally in the regions of the guide elements. In this way, the function of the guide elements, namely the precise alignment of the light waveguide leads to be joined to one another is especially promoted because the pressing powers between the guide elements and the carrier members take effect precisely where the guide elements yielding the precise aligned alignment are present. Over and above this, the particular advantage occurs in that the forces, which are exerted by the spring clip, cannot take effect in the region of the abutment of the light waveguide ends. It has turned out, namely, that even small forces in the region of the light waveguide abutment ends leads to admittedly minor three-dimensional dislocation which, however, always produce a noticeable increase of the attenuation at the joint between waveguides of the two carriers. Also, the present invention assures by means of its arrangement of the spring clip that no undesirable bending or damage to the carrier members which receive the light waveguides will occur.

An especially advantageous embodiment of the invention provides that each of the two carrier members has a respective spring clip of this type allocated to it.

Other developments and advantages and objects of the present invention will be readily apparent from the following description, drawings, and claims.

DESCRIPTION OF THE PREFERRED EMBODIMENTS

Figure 1:
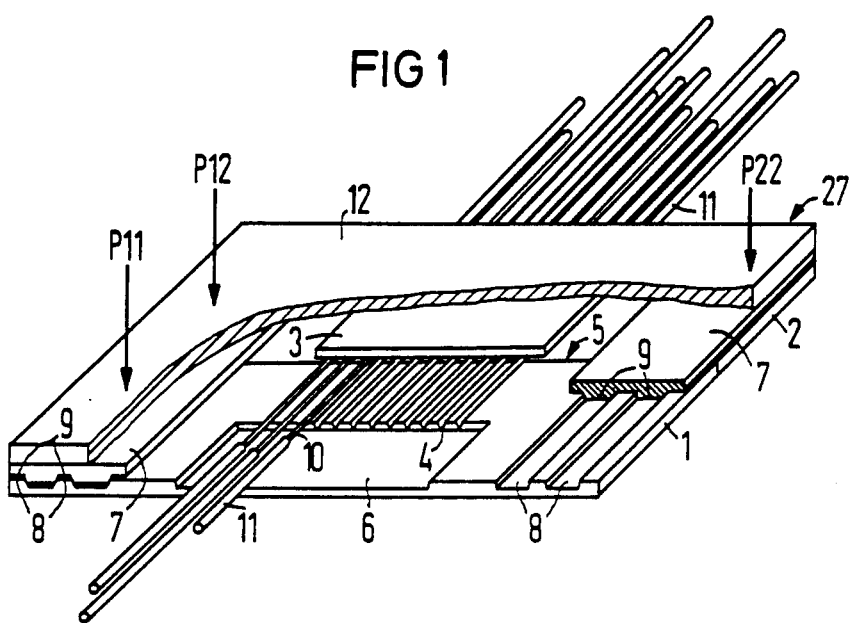
FIG. 1 is a perspective view with portions broken away of a connector element or device in accordance with the present invention.

The principals of the present invention are particularly useful to complete the assembly of parts to form a connector element or device generally indicated at 27 in FIG. 1. The connector device 27 has two carrier members 1 and 2, a base plate 12, which is illustration with parts being broken away in order to make the structure of the inside of the connector device clearly visible.

The two identical carrier members 1 and 2 have their end faces abutting against one another at a common parting location 5. Each of these carrier members 1 and 2, respectively, is advantageously composed of an etchable material such as, for example, silicon, to form centering grooves 4 which have a V shape in view of the suitable etching method. These centering grooves 4 serve for the acceptance and centering of the stripped light waveguides 10. An etched-out recess 6 is located at the end of the centering groove 4 and this recess extends over the entire width of the group of centering grooves 4 and thus offers space in common for all light waveguides 10 together with their cladding layers 11.

After insertion of the waveguides 10, the centering grooves 4, as well as the recess 6, of every carrier member 1 and 2 are covered by a respective cover plate 3 after the insertion of the light waveguides 10 into the grooves 4 and this cover plate 3 is expediently glued to the particular carrier 1 or 2. In the illustrated embodiment, only a cover plate 3 for the carrier 2 is shown, whereas the cover plate for the carrier member 1 has been omitted. The adhesive, which serves the purpose of fixing the light waveguides 10, is introduced proceeding from the end face 5 of the carrier member 1 or 2, respectively. As a consequence of capillary action in the centering grooves 4 and due to the narrow gap betwen the cover plate 3 and the carrier member 1 or 2, respectively, the adhesive penetrates into the inside and, thus, glues the carrier member, cover plate and light waveguides to one another. The recess 6 is subsequently expediently likewise filled with adhesive material. After joining the members, waveguides and cover plates together, the unit is then ground and polished on its end face to form the parting location or surface 5. As illustrated, twelve grooves 4 are arranged side-by-side, for example, for a connector arrangement and these twelves centering grooves 4 proceed parallel to one another in the example at a mutual spacing of 0.5 mm. The length of the centering grooves 4 amount to approximately 5 mm.

Figure 2:
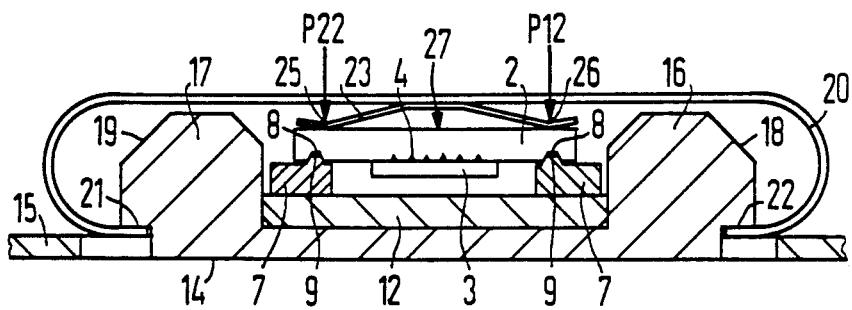
FIG. 2 is a cross sectional view taken at the abutment surfaces between the two carrier members of the device of FIG. 1 illustrating a side view of a fixing element containing a spring clip for the device.

Auxiliary grooves 8, which, like the centering grooves 4, are etched and which proceed parallel to the latter, are adjacent each of the two lateral edges of the carrier members 1 and 2 and outside of the area covered by the cover plate 3. At least one auxiliary groove is provided on each side edge; two are shown in the embodiment of FIG. 1, while only one is shown in the embodiment of FIG. 2. These auxiliary grooves 8 serve the purpose of aligning the two equipped carrier members 1 and 2 by coacting with guide elements 7 having matched, correspondingly salient profiles or ridges 9 which are inserted into these auxiliary grooves 8. The guide elements 7 bridge the common parting location 5 so that both the carrier members 1 and 2 and, thus, the centering grooves 4 as well, are aligned in alignment with one another. The guide elements 7 are secured to a common base plate 12, which covers the entire splice connector. The auxiliary grooves 8 are expediently of a trapezoidal cross section and are matched to the trapezoidal profiles 9 of the guide elements 7 so that the contacting occurs only along the two lateral surfaces of each of the profiles or ridges 9. The ridges 9, as well as the grooves 8 are situated laterally at some distance from the centering grooves 4 in order to prevent moistening with the adhesive. An extremely high precision for the overall connector arrangement can be achieved by the common etching and subsequent parting of the two carrier members 1 and 2. The carrier members 1 or, respectively, 2 have dimension of about 8–9 mm given a thickness of about 0.5 mm. The cover plates 3, which are likewise composed of etchable materials such as, for example, silicon, are divided into two zones at their insides. The one zone lies planarly against the carrier member 1 or, respectively 2, and presses the stripped waveguides 10 into the centering grooves 4. The other zone is provided with a recess which covers the portion of the light waveguide that still have the jackets which are still received in the recess 6. The dimension of the cover plate amount, for example, 4–8 mm, whereby the thickness amounts to about 0.5 mm, for example in the region of the uncoated light waveguides, and amounts to about 0.3 mm in the region having the recess that overlies the recess 6.

When a releasable connection between the two carrier members 1 and 2, as well as between the guide elements 7 secured to the base plate 12 is desired, compression forces, which press these parts against one another must be provided. When a firmer pressing power is obtained, a better alignment between the parts is obtained. On the other hand, however, it must be assured that absolutely no twisting or distortion occurs in the region of the abutments of the light waveguide ends when these pressing powers take effect, because the splice attenuation would be increased as a result. The solution of this problem is by applying the compression forces only in area of the guide elements 7 as indicated by the arrows P11, P12, and P22, wherein a fourth force P21 is not illustrated, but it being mirror-inverted relative to the force P11 illustrated in FIG. 1. Since the forces P11, P12, P21, and P22 are only applied in the region of the guide elements 7 to hold the profiles or ridges 9 in the grooves 8, the abutting region in which the end faces of the light waveguides 10 abut one another remains free of forces so that an increase in the attenuation and/or deterioration are avoided in this critical region.

In order to apply the pressing forces as mentioned with regard to the forces P11, P12, P21 and P22 of FIG. 1, a structure illustrated in FIG. 2 is utilized. As illustrated, a connector element of FIG. 1 is shown inverted or turned 180° wherein a section is placed precisely along the parting plane 5. Thus, only the end face of the basic element 2 with the cover plate 3 secured thereto is visible. In a departure from the embodiment of FIG. 1, only one profile or ridge 9 and one groove 8 is provided along each of the edges of the carrier member 2.

The parts of the connector element or device 27 itself are held together in an assembled relationship by fixing means which includes receptacle means 14, which has two lateral edges or ridges 16 and 17 whose inside surfaces form a lateral detent or guide surface for the base plate 12. Each of the ridges 16 and 17 on an outer edge have undercuts 22 and 21, respectively, into which the U-shaped ends of a clamp 20 are engaged. The receptacle means 14 is received in an aperture of a splicing plate 15 which, for example, can be a component part of a splice housing or a sleeve. The clamp 20 is latched into the lateral legs or ridges 16 and 17 of the receptacle means 14, and this latching is facilitated by appropriate bevels such as 18 and 19 on the outside ridges 16 and 17. It should be pointed out that the clamps are expediently provided so that there is a clamp 20 provided for each one of the carrier members 1 and 2.

A spring clip 23 is attached, preferably by spot welding, in the middle part of the clamp 20 and the ends of the spring clip 23, which are bent over somewhat in an upward direction lie against the carrier member 2 at the contact or sealing areas 25 and 26. These seating 25 and 26, which actually are seating lines, are selected so that they lie in the region of the guide element 7, namely, preferably in the proximity of the profile 9 and of the auxiliary groove 8. A mechanical pressure corresponding, for example, to the force arrows P12 and P22 is thereby exerted exactly where the groove 8 and the ridge 9 engage to provide the force to align of the two carrier members 1 and 2. With this type of application of the forces, no deformation whatsoever will occur in the inside region of the carrier members 1 and 2, and the alignment of the ends of the light waveguide fibers is not deteriorated in any way whatsoever by the forces exerted by the spring clip 23. It continues to be assured that the sensitive, extremely thin and brittle carrier members 1 and 2, which are usually composed of silicon, are not subject to any bending stresses which would lead to fractures.

The clamp 20 also simultaneously serves for the external protection and for covering the overall splice connection. The spring clip 23 extends at right angles relative to the longitudinal axis of the light waveguides which are accommodated in the centering grooves 4. The transverse extent of the spring clip 23 is expediently selected so that it extends only over a part of the length of the associated carrier member 1 or 2, for example for about 50% of the length of the carrier member. The spring properties of the clamps 20 are expediently selected so that they are significantly stiffer than the respective spring clip 23 so that the spring clip 23 should exhibit a considerable lower spring constant than the clamp 20. It is also expedient in this context to select a softer material for the spring clip 23 and/or a material which is thinner in cross section than for the relatively stiff clamp 20 and/or to make the spring clip 23 less broad than the clamp 20. The spring clip 23 can also be fashioned with slots in the outside region adjacent to the seating locations 25 and 26.

Although various minor modifications may be suggested by those versed in the art, it should be understood that I which to employ within the scope of the patent granted hereon, all such modifications as reasonably and properly come within the scope of my contribution to the art.

I claim:

1. In a connector device for a plurality of light waveguides having longitudinal axes, said device including two carrier members having parallel extending centering grooves and a parting surface extending at right angles to the grooves, at least one guide groove adjacent both edges of the carrier member extending parallel to the centering grooves, waveguides being arranged in said centering grooves with the end faces of the waveguides lying in the parting surface, a bridging guide element having a ridge for each of the guide grooves at the edges and having a length to extend between two aligned carrier members and fixing means for holding the carrier members with the abutting surfaces engaged in an abutting region and the guide elements with their ridges in the grooves to hold the waveguides of one carrier element aligned with the waveguides of the other, the improvements comprising the fixing means includes at least one spring clip, said spring clip extending at right angles relative to the longitudinal axes of the light waveguides, said spring clip being provided to apply pressing forces only adjacent each of the lateral ranges on said guide elements to hold the guide elements in the guide grooves and the abutting region where the end faces of the light waveguides abut one another remaining free form said pressing forces.

2. In a connector device according to claim 1, wherein each of the guide element is arranged on a base plate which covers the abutting location of the light waveguides when the carrier members, guide elements and base plate are held in the assembled position by the fixing means.

3. In a connector device according to claim 1, wherein the fixing means includes two spring clips with each carrier member having a spring clip allocated to it.

4. In a connector device according to claim 1, wherein the spring clip extends over only a part of the length of the carrier member.

5. In a connector device according to claim 1, wherein the fixing means includes a receptacle means receiving the connector device, said fixing means including at least one resilient clamp engaged on the receptacle means, said spring clip being mounted on the resilient clamp.

6. In a connector device according to claim 5, wherein the spring clip exhibits a lower spring constant than the clamp.

7. In a connector device according to claim 6, wherein the spring clip is less broad than the clamp.

8. In a connector device according to claim 7, wherein the spring clip has a slot in each of its end regions.

9. In a connector device according to claim 6, wherein the spring clip is provided with a slot in each of its end regions.

10. In a connector device according to claim 6, wherein the spring clip is composed of a thinner material than the clamp.

11. In a connector device according to claim 10, wherein the spring clip is less broad than the clamp.

12. In a connector device according to claim 11, wherein the spring clip is provided with a slot in each of its end regions.

13. In a connector device according to claim 10, wherein the spring clip is provided with a slot in each of its end regions.

14. In a connector device according to claim 1, wherein the fixing means include a receptacal means receiving the connector device and has a recess with two ridges, a clamp for each of the carrier members engaging the ridges of the receptacal means and overlying the carrier member when the connector device is received therein, a spring clip for each of the clamps being secured to the resilient clamp and acting on each of the guide elements to urge the ridges into the groove to position the carrier members and waveguides in a desired alignment.

15. In a connector device according to claim 14, wherein each of the spring clips exhibits a lower spring constant than its respective clamp member.

16. In a connector device according to claim 15, wherein the spring clip has a dimension extending parallel to the waveguides which is substantially less than the corresponding dimension of the clamp so that the clamp member substantially cover the carrier member as the spring member only uses a small portion thereof.

* * * * *